United States Patent [19]
Hall, Jr.

[11] 3,930,218
[45] Dec. 30, 1975

[54] GEOPHONE CASINGS
[75] Inventor: Ernest M. Hall, Jr., Houston, Tex.
[73] Assignee: Walker-Hall-Sears, Inc., Houston, Tex.
[22] Filed: Jan. 16, 1974
[21] Appl. No.: 433,637

[52] U.S. Cl. .................................. 340/17; 220/306
[51] Int. Cl.² .......................................... G01V 1/16
[58] Field of Search .......... 340/17; 181/.5 R, .5 EC; 220/306; 215/321, 31'7

[56] References Cited
UNITED STATES PATENTS

| | | | |
|---|---|---|---|
| 1,867,098 | 7/1932 | Rieber | 340/17 |
| 2,705,314 | 3/1955 | Gaby | 340/17 |
| 2,908,890 | 10/1959 | Campbell et al. | 340/17 |
| 3,355,061 | 11/1967 | Ritter | 220/306 |
| 3,445,809 | 5/1969 | McLoad | 340/17 |
| 3,609,263 | 9/1971 | Clementi | 220/306 |

*Primary Examiner*—T. H. Tubbesing
*Assistant Examiner*—T. M. Blum
*Attorney, Agent, or Firm*—Michael P. Breston

[57] ABSTRACT

In a geophone casing having a base and a cover for housing a geophone, snap-on securing means forming integral part with the walls of the casing are provided to allow the base and cover to interlock.

1 Claim, 14 Drawing Figures

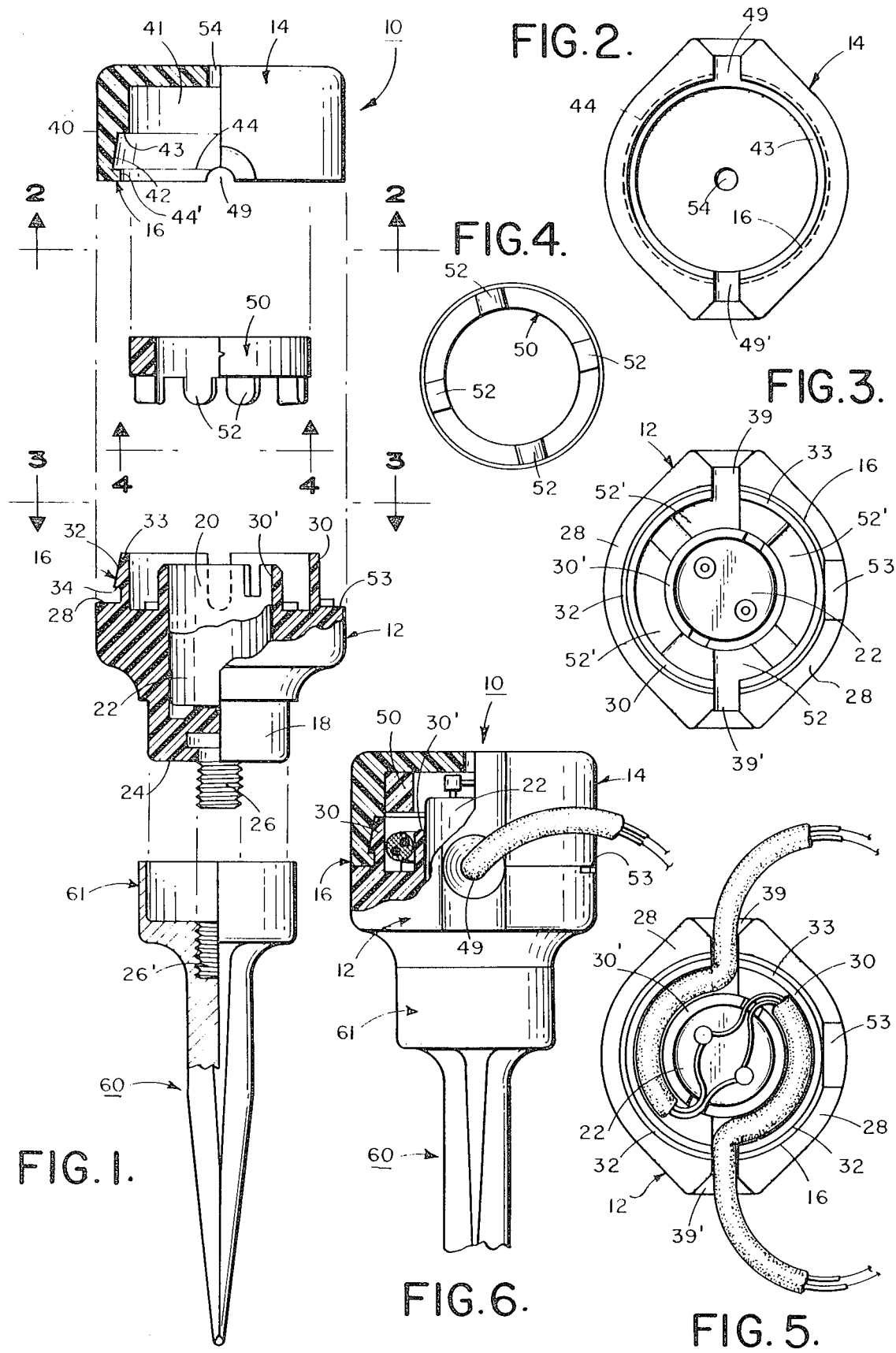

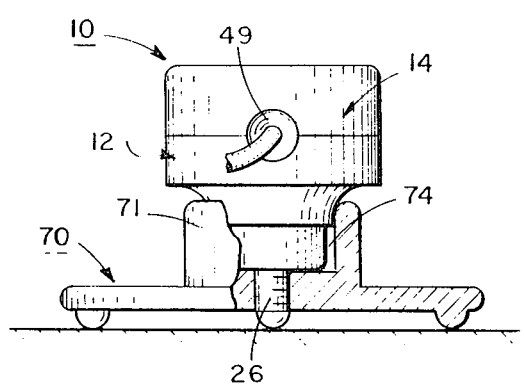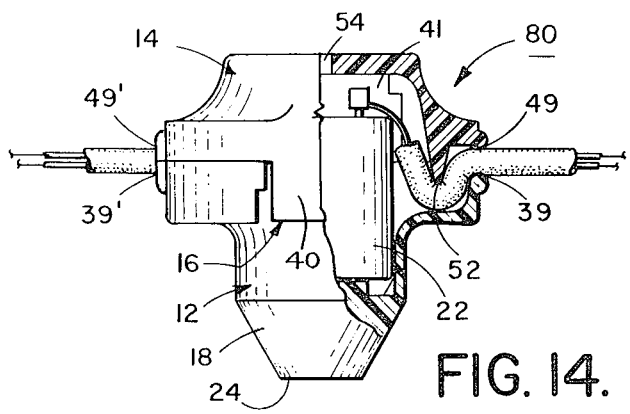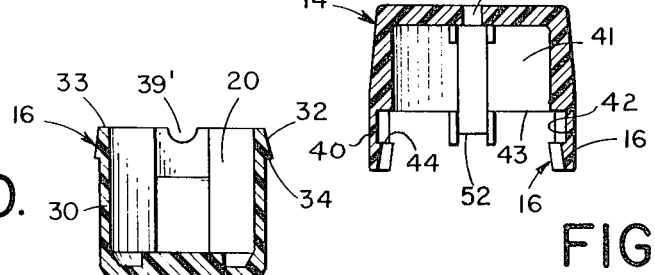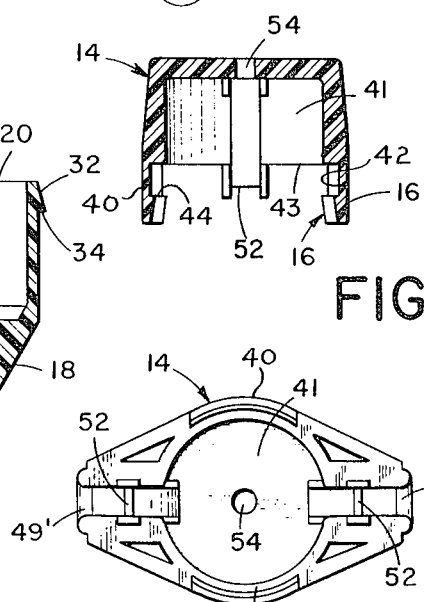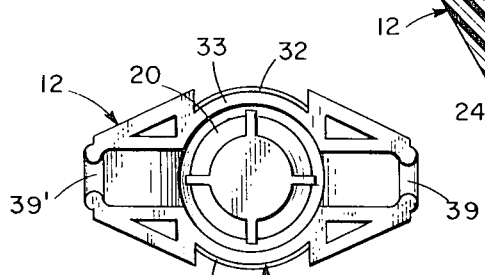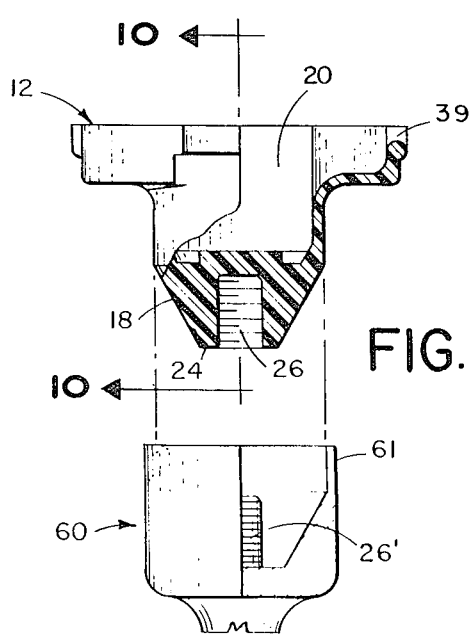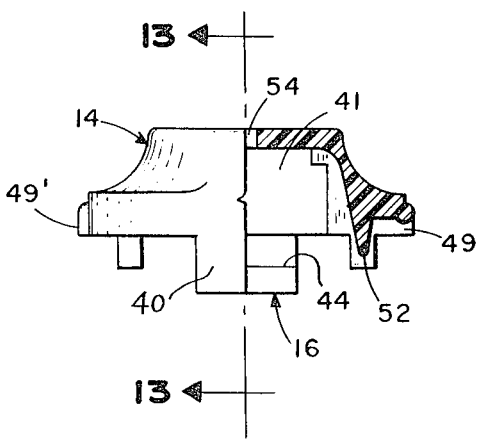

GEOPHONE CASINGS

FIELD OF THE INVENTION

This invention relates to seismic geophone housings and to the means for coupling them to the ground.

BACKGROUND OF THE INVENTION

Seismic geophones of the moving coil type are widely used to detect returned seismic energy during seismic exploration. Known geophones have a cylindrical configuration and at least two output wires. For land seismic use, each geophone is normally housed in a plastic casing consisting of two halves secured to each other by suitable external fastening means such as: slip-on rings with or without a split; screws and nuts; etc.

Such a typical prior art geophone casing, having a base and a cover, is described in U.S. Pat. No. 3,119,978. The base and the cover are secured to each other by external circular metal bands clamped around cylindrical projections. In addition to their cost, the bands require special jigs to put them on and take them off. In field use, such jigs are difficult to keep on a crew. As a result many defective casings with their geophones are often discarded.

Another known problem lies with the means for coupling the casings to the ground. The coupling means frequently rupture the stud-containing, bottom wall of the casing. A ruptured casing effectively uncouples it geophone from the ground with a consequent loss of detected seismic energy. To remove the geophone from and to replace the ruptured casing, whose base and cover are fastened by external fastening means, is relatively very time consuming.

Accordingly, this invention has for its main object the elimination of the external fastening means in geophone casings. Another object is to provide ground coupling means which, in use, do not damage the geophone casings.

SUMMARY OF THE INVENTION

Each geophone casing of this invention includes fastening means which is self-locking and therefore requires no tools for its assembly. The fastening means is preferably of the snap-on type requiring only pressure to lock it and force to unlock it.

The ground coupling means for the casing is provided with a cradle which cradles the bottom wall of the casing thereby protecting the stud-containing wall thereof.

BRIEF DESCRIPTION OF THE DRAWINGS

FIG. 1 is an exploded view, partly in section, of one embodiment of the casing and cover of this invention;

FIGS. 2, 3 and 4 are views on lines 2—2, 3—3, and 4—4 in FIG. 1, respectively;

FIG. 5 is a top view of the casing showing a geophone therein;

FIG. 6 is a perspective view, partly in section, of an assembled casing with a cover and a geophone therein;

FIG. 7 is a perspective view showing an assembled casing supported by a tripod, partly in section;

FIG. 8 is a view in perspective of a modified embodiment of the casing and of a spike support therefor;

FIG. 9 is a top view of the casing shown in FIG. 8;

FIG. 10 is a sectional view on line 10-10 in FIG. 8;

FIG. 11 is a view in perspective, partly in section, of a mating cover for the casing of FIG. 8;

FIG. 12 is a bottom view of the cover shown in FIG. 11;

FIG. 13 is a sectional view on line 13-13 in FIG. 11; and

FIG. 14 is a view in perspective, partly in section, of an assembled casing, cover and geophone.

In each embodiment of the drawings, the geophone comprises a base 12 and a cover 14. Their geometric configurations depend on the expected forces to become exerted on the casing, and in any event are not critical. Since the geophones are cylindrical in shape, each casing is required to provide a cylindrical cavity and sufficient space external to the cavity to accommodate therrein therein wires extending from the geophone. The base and the cover in order to capture the geophone and its leads must be securely fastened to each other. In the prior art such fastening means were distinct from and external to the casing.

In accordance with the present invention such fastening means form integral part with the walls of the casing thereby eliminating the need for distinct and external fastening means and the specialized tooling required therefor to fasten and unfasten the casings therewith. The fastening means of this invention are generally designated as 16 and can be characterized as being of the snap-on type having interlocking male and female prongs.

To facilitate the further description of the drawings, the same numerals will be used throughout the drawings whenever possible to show similiarity of function, and some numerals will be followed with a prime (') to designate symmetry with respect to a plane or axis.

A particular geophone casing 10 shown in FIGS. 1-6 will now be described. Base 22 has a wall 18 defining a cylindrical chamber 20, adopted to house therein a conventional geophone 22. Embedded in the bottom wall 24 of base 14 is a stud 26 whose threaded portion extends outwardly for threadedly engaging a suitable casing support which will be subsequently described.

Wall 18 defines a flat shoulder 28 and two axially extending, cylindrical and concentric walls 30 and 30'. Wall 30 has an outer face in which is constituted the male prong of the snap-on fastener 16. The male prong defines a frosto-conical wall 32 tapering inwardly toward the free end 33 of prong 30. The base of wall 32 forms an external annular shoulder 34.

The cover 14 of casing 10 has a wall 40 which also defines a cylindrical chamber 41 for capturing the top end of geophone 22. The inner face of wall 40 forms the female prong of the snap-on fastening means 16. Prong 40 defines a frosto-conical surface 42 which matches the frosto-conical surface 32. The flat annular top surface 33 of prong 30 abuts against a flat inwardly extending annular shoulder 43 in prong 40, and shoulder 34 of prong 30 will abuttingly engage an inwardly extending annular shoulder 44 to thereby allow male prong 30 to become fully captured by and inside of the female prong 40.

Upon such capture, annular lip 44' engages beneath external shoulder 34.

Walls 30 and 30' in base 12 also define two diametrically opposite channels 39 and 39' which in use align with two diametrically opposite openings 49–49' in the cover 14. Openings 39 and 49 serve two purposes: they allow the geophone leads to exit from the inside of the casing and they allow the male prong 30 to be sufficiently resilient whereby cover 14 can be forced over the male prong 30 in snap-on fashion. The forcible closure of the cover over the base completely captures the geophone and completes the mating engagement of the female and male prongs 30 and 40 of the snap-on fastener 16. The base and the cover can be uncoupled by prying, say with a screwdriver, inside a slot 53 formed at the edge of the base.

To more securely maintain the geophone leads inside the cylindrical cavity defined by walls 30 and 30' there is provided an annular retainer ring 50 having downwardly-extending cleats 52 angularly spaced apart to crimpingly engage the geophone's leads against opposite slot surfaces 52' in the base 12, as best shown in FIG. 3.

In use, the geophone casing 10 is threadly coupled to a ground coupling means which conventionally takes the form of a spike 60 (FIG. 1) or of a tripod 70 (FIG. 7). The threaded portion of stud 26 engages a threaded cavity 26'. To prevent the breaking out of stud 26 from wall 24 of base 14 in response to shearing forces, spike 60 is provided in accordance with this invention with a cradle 61 for cradling the lower portion of cylindrical wall 18 of base 14. Thus any external forces becoming exerted between casing 10 and spike 60 will be transmitted from the spike to the entire casing instead of only to the bottom wall containing stud 26. A similar cradle 71 is provided in the conventional tripod 70 for the same purposes.

In the presently preferred embodiment 80 shown in FIGS. 8-14, the cylindrical wall 18 of base 14 has been considerably reduced in thickness, wall 30 was eliminated, retainer ring 50 was made integral part with the cover 14, and male prong 30 instead of consisting of two substantially semi-cylindrical portions, now consists of two diametrically opposite, upwardly extending quadrants, each preferably defining a frusto-conical surface 52 and an external shoulder 34. Female prong 40 consists of two diametrically opposite and downwardly extending flanges, extending over an arcuate length sustained by the same angle as that of prong 30.

Accordingly, the fastening means 16 operate as described in connection with the embodiment shown in FIGS. 1-8. It will be appreciated, however, that the fastening means 16 in casing 80 (FIG. 8) is easier to snap on as compared to the fastening means in casing 10 (FIG. 1), since the prongs in casing 80 are quadrants rather than semi-cylinders. Cover 14 has an opening 54 through which a suitable filler material is pumped into the casing to fully embed the geophone therein.

Other variations will readily suggest themselves to those skilled in the art, and all such variations are intended to fall within the scope of the claims attached hereto.

What is claimed is:

1. In a geophone casing comprising: a base made from a rigid, nonconductive material, said base defining a first substantially cylindrical chamber adapted to receive therein the bottom end of a seismic geophone, said base having a first wall; a cover for said base, said cover being made from a rigid, nonconductive material, said cover defining a second substantially cylindrical chamber adapted to receive therein the top end of said geophone, said cover having a second wall, said first and second walls having openings therein to allow the geophone's leads to exit outwardly of the casing, the improvement consisting of:

wholly self-locking means having a rigid male prong and a rigid female prong forming integral part with said first and second walls, respectively; said male and female prongs interlocking with each other when said base and said cover are forcibly assembled together, said male prong having a frusto-conical, external surface tapering inwardly toward the free end thereof, and the male prong defining an external annular shoulder spaced from said free end, said female prong having a mating cavity matching in shape the shape of said external surface and including an annular lip engageable beneath said external annular shoulder, said male prong being constructed to have sufficient resiliency to slightly bend inwardly when said lip is pushed downwardly over said frusto-conical surface until said lip comes to rest under said annular shoulder, and said cover comprising an internal ring having downwardly-extending cleats adapted to engage the geophone's leads inside said casing.

* * * * *